United States Patent
Slater et al.

(10) Patent No.: US 10,550,876 B2
(45) Date of Patent: Feb. 4, 2020

(54) FASTENER WITH ATTACHED COMPRESSION LIMITING SLEEVE

(71) Applicant: Acument Intellectual Properties, LLC, Sterling Heights, MI (US)

(72) Inventors: Jeramiah Slater, Grand Blanc, MI (US); Robert A. Niec, Burt, MI (US); Paul Purdy, Holly, MI (US); Gary Sifferman, Grand Blanc, MI (US)

(73) Assignee: ACUMENT INTELLECTUAL PROPERTIES, LLC, Sterling Heights, MI (US)

( * ) Notice: Subject to any disclaimer, the term of this patent is extended or adjusted under 35 U.S.C. 154(b) by 411 days.

(21) Appl. No.: 13/657,339

(22) Filed: Oct. 22, 2012

(65) Prior Publication Data
US 2013/0142588 A1 Jun. 6, 2013

Related U.S. Application Data

(60) Provisional application No. 61/566,911, filed on Dec. 5, 2011.

(51) Int. Cl.
*F16B 41/00* (2006.01)
(52) U.S. Cl.
CPC .................. *F16B 41/002* (2013.01)
(58) Field of Classification Search
CPC .. Y10S 411/97; Y10S 411/999; F16B 5/0233; F16B 5/0208; F16B 5/025; F16B 19/02; F16B 37/0842; F16B 41/002; F16B 43/00; F16B 5/01

USPC ................. 411/546, 353, 512, 970, 999, 107
See application file for complete search history.

(56) References Cited

U.S. PATENT DOCUMENTS

| | | | | |
|---|---|---|---|---|
| 2,275,315 A | * | 3/1942 | Ray | F16B 43/00 351/146 |
| 2,700,172 A | * | 1/1955 | Rohe | F16B 5/01 16/2.1 |
| 2,931,412 A | * | 4/1960 | Wing | 411/108 |
| 3,584,667 A | | 6/1971 | Reiland | |
| 4,189,979 A | * | 2/1980 | Silverwood | 411/54 |
| 4,621,961 A | | 11/1986 | Gulistan | |
| 4,732,519 A | | 3/1988 | Wagner | |
| 4,941,769 A | * | 7/1990 | Natsume | 403/408.1 |
| 5,244,325 A | | 9/1993 | Knohl | |
| 5,255,647 A | | 10/1993 | Kiczek | |
| 5,328,311 A | | 7/1994 | Knohl | |
| 5,336,028 A | | 8/1994 | Yamamoto | |

(Continued)

*Primary Examiner* — Flemming Saether
(74) *Attorney, Agent, or Firm* — Clark Hill PLC; James R. Foley

(57) ABSTRACT

A fastener system that includes a fastener, a compression-limiting sleeve, and a retainer which generally retains the compression-limiting sleeve on the fastener. By providing that the compression-limiting sleeve is not staked to the fastener, existing technology can be used, and no extra staking processing step needs to be performed. The fastener may comprise a conventional metal threaded screw or bolt, possibly having a recess in its head for receiving a driver. Preferably, the compression-limiting sleeve is cold headed as opposed to being stamped, and preferably includes a counter bore which assures that an end of the retainer is below an end surface of the compression-limiting sleeve. Preferably, the retainer is formed of a thermoplastic elastomer or another suitable material.

14 Claims, 1 Drawing Sheet

(56) References Cited

U.S. PATENT DOCUMENTS

| | | | |
|---|---|---|---|
| 5,395,194 A | | 3/1995 | Johnson et al. |
| 5,577,854 A | * | 11/1996 | Jacob et al. ............... 403/2 |
| 5,662,444 A | | 9/1997 | Schmidt, Jr. |
| 5,704,572 A | * | 1/1998 | Vogel et al. ............... 248/65 |
| 5,807,052 A | | 9/1998 | Van Boven et al. |
| 5,871,319 A | | 2/1999 | Schneider |
| 5,980,174 A | * | 11/1999 | Gallagher et al. .......... 411/55 |
| 6,030,161 A | | 2/2000 | Udell et al. |
| 6,044,536 A | | 4/2000 | Schneider |
| 6,055,790 A | * | 5/2000 | Lunde ............... E04C 2/365 |
| | | | 52/787.1 |
| 6,059,503 A | | 5/2000 | Johnson |
| 6,225,566 B1 | * | 5/2001 | Dienst ............... H01B 17/56 |
| | | | 174/138 D |
| 6,227,783 B1 | | 5/2001 | Salameh |
| 6,280,132 B1 | | 8/2001 | Szczukowski et al. |
| 6,309,157 B1 | | 10/2001 | Amann et al. |
| 6,457,925 B1 | | 10/2002 | Genick, II |
| 6,478,519 B1 | | 11/2002 | Genick, II |
| 6,685,409 B2 | | 2/2004 | Braun et al. |
| 6,761,521 B2 | | 7/2004 | McCormack et al. |
| 7,210,885 B2 | * | 5/2007 | Pinzl ............... 411/353 |
| 7,708,512 B2 | | 5/2010 | McLean et al. |
| 7,771,149 B2 | | 8/2010 | Bauer et al. |
| 8,202,031 B2 | | 6/2012 | Hartmann |
| 8,210,784 B2 | | 7/2012 | Hartmann |
| 2002/0009350 A1 | * | 1/2002 | Radtke ............... 411/353 |
| 2002/0159861 A1 | * | 10/2002 | Genick, II ............... 411/353 |
| 2006/0226312 A1 | * | 10/2006 | Masuch ............... 248/188 |
| 2008/0095593 A1 | * | 4/2008 | McLean et al. ............... 411/360 |

\* cited by examiner

FASTENER WITH ATTACHED COMPRESSION LIMITING SLEEVE

RELATED APPLICATION (PRIORITY CLAIM)

The present application claims the benefit of U.S. Provisional Application Ser. No. 61/566,911, filed Dec. 5, 2011, which is hereby incorporated by reference in its entirety.

BACKGROUND

The present invention generally relates to fasteners, and more specifically relates to a fastener system that has a compression-limiting sleeve effectively attached to a fastener.

In a fastener application where there is a need to limit compression, a conventional fastener system provides that a compression limiting member, such as a stamped sleeve or bushing, is staked to a threaded fastener. The sleeve or bushing, with the threaded fastener staked thereto, is then inserted into a hole which is provided in a first workpiece, and subsequently the fastener is threaded into a threaded bore which is provided in a second workpiece. This secures the first workpiece to the second workpiece, and provides that the sleeve or bushing absorbs compressive forces that otherwise would have to be absorbed by the first workpiece.

Disadvantages of such a fastener system include the fact that staking requires a secondary operation. Additionally, stamping the sleeve or bushing results in significant scrap and provides that tolerances cannot be closely controlled. Furthermore, the system does not readily provide that the column strength of the sleeve or bushing can be changed merely by altering the wall thickness or hardness of the sleeve or bushing.

SUMMARY

An object of an embodiment of the present invention is to provide an improved fastener system for use in an application where compression is relevant or must be absorbed.

Briefly, an embodiment of the present invention provides a fastener system that includes a fastener, such as a threaded bolt or screw, a compression-limiting sleeve, and a retainer which generally retains the compression-limiting sleeve on the fastener. By providing that the compression-limiting sleeve is not staked to the fastener, existing technology can be used, and no extra staking processing step needs to be performed.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DESCRIPTION OF AN ILLUSTRATED EMBODIMENT

Figure 1:
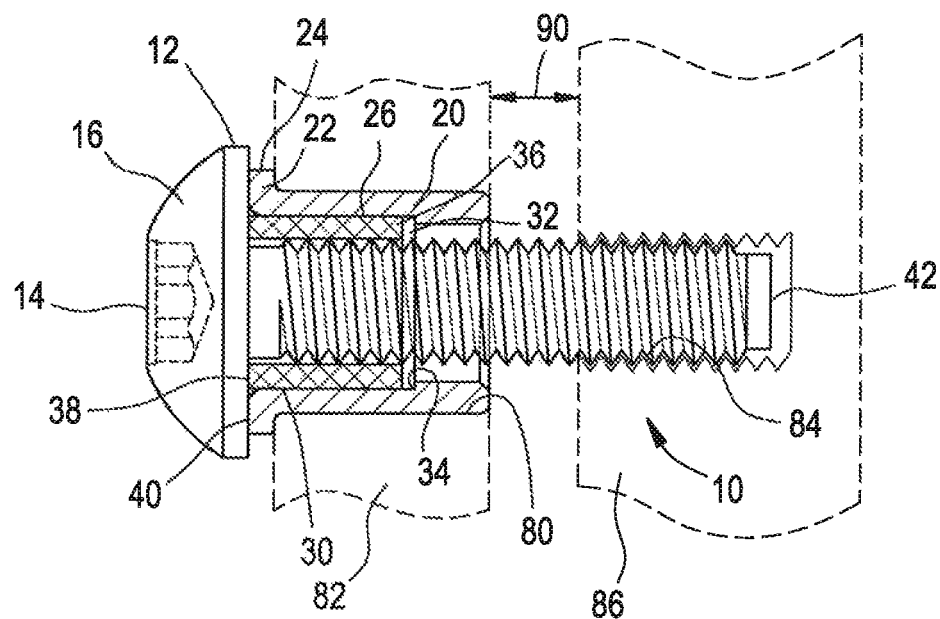
FIG. 1 is a cross-sectional view of a fastener system which is in accordance with an embodiment of the invention.

While this invention may be susceptible to embodiment in different forms, there is shown in the drawings and will be described herein in detail, a specific embodiment with the understanding that the present disclosure is to he considered an exemplification of the principles of the invention, and is not intended to limit the invention to that as illustrated.

FIG. 1 illustrates a fastener system 10 which in accordance with an embodiment of the present invention. The fastener system 10 is configured for use in applications where limiting compression is relevant. Specifically, the fastener system 10 comprises a fastener 12, such as a conventional threaded screw or bolt. The fastener 12 is preferably formed of metal, and preferably incorporates a drive system (such as a recess 14 on a head 16 of the fastener 12) to transfer tightening torque, such as a drive system consistent with that which is disclosed in U.S. Pat. No. 3,584,667, for example. While the fastener 12 is shown as having a head 16 with a recess 14, the present invention can be employed with effectively any head style with regard to the fastener 12.

The fastener system 10 also comprises a compression-limiting sleeve 20. Preferably, the compression-limiting sleeve 20 is also formed of metal, and is preferably cold headed as opposed to being stamped. This not only results in significantly less scrap, but also provides that both the outer diameter and the inner diameter of the compression-limiting sleeve 20 can be formed to a tight tolerance. Preferably, the compression-limiting sleeve 20 is generally cylindrical, but may include a lip 22 at one end 24 thereof as shown in FIG. 1. As shown, the compression-limiting sleeve 20 also preferably includes an internal counter bore 26. The function of this counter bore 26 will be described more fully hereinbelow. Preferably, the compression-limiting sleeve 20 has a minimum bearing surface which is engineered to effectively meet the strength of the fastener 12 being used in the system 10. While the compression-limiting sleeve 20 is shown as having a lip 22, the present invention can be employed with or without the lip 22.

Figure 2:
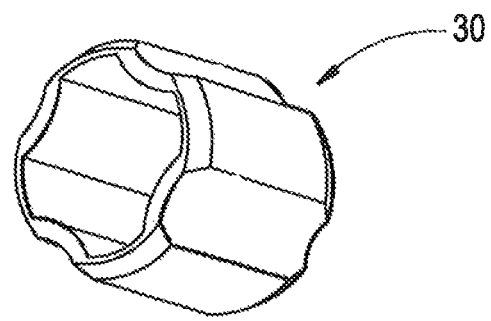
FIG. 2 is a perspective view of a retainer component of the fastener system shown in FIG. 1.

As shown in FIG. 1, the fastener system 10 also comprises a retainer 30. The retainer 30 is configured to generally retain the compression-limiting sleeve 20 on the fastener 12, without having to physically stake the compression-limiting sleeve 20 to the fastener 12. Preferably, the retainer 30 is formed of a thermoplastic elastomer or another suitable material. Specifically, the retainer 30 may have a profile as shown in FIG. 2, and specifically may be provided as being consistent with that which is disclosed in U.S. Pat. No. 5,395,194; Reissue No. 36,164; and U.S. Pat. No. 6,039,525. As shown in FIG. 1, the fastener 12 extends through the retainer 30, and the retainer 30 is disposed generally between the fastener 12 and the compression-limiting sleeve 20. Preferably, the retainer 30 retains the fastener 12 relative to the compression-limiting sleeve 20 such that the fastener 12 can float longitudinally, such as at least 1 mm, to facilitate alignment during installation.

As discussed briefly above, the compression-limiting sleeve 20 preferably includes a counter bore 26. The space 32 between an internal shoulder 34 of the counter bore 26 of the compression-limiting sleeve 20 and the one end 36 of the retainer 30 assures that the other end 38 of the retainer 30 will be below an end surface 40 of the compression-limiting sleeve 20 once the fastener system 10 is installed.

To install the fastener system 10, the compression-limiting sleeve 20, while being retained on the fastener 12 by the retainer 30, is inserted in a hole 80 in a first workpiece 82 (see FIG. 1). Then, an end 42 of the fastener 12 is aligned with a threaded bore 84 in a second workpiece 86. A driver is engaged with the recess 14 in the head 16 of the fastener 12, and the driver is actuated to drive the fastener 12 into the second workpiece, thereby effecetively securing the second workpiece to the first workpiece (as indicated by arrow 90 in FIG. 1). During and after installation, the compression-limiting sleeve limits or absorbs compressive forces which otherwise would impact the first workpiece.

As discussed above, preferably the compression-limiting sleeve 20 is cold headed as opposed to being stamped. This not only results in significantly less scrap, but also provides that the compression-limiting sleeve 20 can be formed to tighter tolerances. Additionally, because the retainer 30 functions to retain the compression-limiting sleeve 20 on the fastener 12 as opposed to the compression-limiting sleeve 20 having to he staked on the fastener 12, a secondary staking operation need not be performed and existing technology can be utilized to assemble and hold the components of the fastener system 10 together. Furthermore, the fastener system 10 provides that the column strength of the compression-limiting sleeve 20 can be easily matched to the application by varying the wall thickness or hardness (or both) of the compression-limiting sleeve 20.

While a specific embodiment of the invention has been shown and described, it is envisioned that those skilled in the art may devise various modifications without departing from the spirit and scope of the present invention.

What is claimed is:

1. A stand-alone, installable fastener system comprising: a fastener having a thread thereon; a compression-limiting sleeve having an end surface; and a retainer comprising a thermoplastic elastomer which engages the compression-limiting sleeve and which comprises parallel internal walls which extend from one end of the retainer to an opposite end of the retainer, wherein the parallel internal walls engage the thread on the fastener such that the fastener floats longitudinally to facilitate alignment pre-installation, wherein the compression-limiting sleeve comprises a counter bore, wherein the retainer engages the counter bore of the compression-limiting sleeve and the thread on the fastener such that the retainer retains the compression-limiting sleeve on the fastener, wherein the counter bore comprises an internal shoulder, wherein a space is provided between the internal shoulder of the counter bore of the compression-limiting sleeve and the one end of the retainer, said space configured to provide that the opposite end of the retainer is disposed below the end surface of the compression-limiting sleeve after installation.

2. A stand-alone, installable fastener system as recited in claim 1, wherein the retainer is positioned between the fastener and the compression-limiting sleeve.

3. A stand-alone, installable fastener system as recited in claim 1, wherein the retainer is positioned between the fastener and the compression-limiting sleeve, and the retainer contacts the fastener and contacts the compression-limiting sleeve.

4. A stand-alone, installable fastener system as recited in claim 1, wherein the fastener comprises a metal threaded fastener.

5. A stand-alone, installable fastener system as recited in claim 1, wherein the fastener comprises a head having a recess therein.

6. A stand-alone, installable fastener system as recited in claim 1, wherein the compression-limiting sleeve is metal.

7. A stand-alone, installable fastener system as recited in claim 1, wherein the compression-limiting sleeve comprises a lip proximate the end surface.

8. A stand-alone, installable fastener system as recited in claim 1, wherein the compression-limiting sleeve is cold headed.

9. A stand-alone, installable fastener system as recited in claim 1, wherein the retainer comprises a bore through which the fastener extends.

10. A stand-alone, installable fastener system as recited in claim 1, wherein the fastener comprises a head, wherein both the compression-limiting sleeve and the retainer contact the head of the fastener.

11. A stand-alone, installable fastener system as recited in claim 1, wherein the compression-limiting sleeve has an interior surface, and the retainer contacts the interior surface of the compression-limiting sleeve.

12. A stand-alone, installable fastener system as recited in claim 1, wherein the fastener comprises a head and an end which is opposite the head, wherein the end of the fastener extends past the end surface of the compression-limiting sleeve, wherein both the compression-limiting sleeve and the retainer contact the head of the fastener.

13. A stand-alone, installable fastener system as recited in claim 1, wherein the fastener comprises a head and an end which is opposite the head, wherein the end of the fastener extends past the end surface of the compression-limiting sleeve, wherein both the compression-limiting sleeve and the retainer contact the head of the fastener, wherein the compression-limiting sleeve has an interior surface, and the retainer contacts the interior surface of the compression-limiting sleeve.

14. A stand-alone, installable fastener system as recited in claim 1, wherein the retainer comprises parallel external walls which extend from the one end of the retainer to the opposite end of the retainer, wherein the parallel external walls engage an internal surface of the compression-limiting sleeve.

* * * * *